US007328265B2

(12) United States Patent
Anstey et al.

(10) Patent No.: US 7,328,265 B2
(45) Date of Patent: Feb. 5, 2008

(54) METHOD AND SYSTEM TO AGGREGATE EVALUATION OF AT LEAST ONE METRIC ACROSS A PLURALITY OF RESOURCES

(75) Inventors: Kathy Anstey, Cary, NC (US); Brad Fisher, Chapel Hill, NC (US); Jeff Summers, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 10/708,910

(22) Filed: Mar. 31, 2004

(65) Prior Publication Data

US 2005/0228878 A1    Oct. 13, 2005

(51) Int. Cl.
*G06F 15/173* (2006.01)

(52) U.S. Cl. ............... 709/226; 709/223; 709/224; 709/225

(58) Field of Classification Search .......... 709/226, 709/223, 224, 225
See application file for complete search history.

(56) References Cited

U.S. PATENT DOCUMENTS

| | | | |
|---|---|---|---|
| 6,226,377 B1 | 5/2001 | Donaghue, Jr. | |
| 6,230,183 B1 | 5/2001 | Yocom et al. | |
| 6,272,544 B1 | 8/2001 | Mullen | |
| 6,445,916 B1 | 9/2002 | Rahman | |
| 6,459,682 B1 | 10/2002 | Ellesson et al. | |
| 6,560,649 B1 | 5/2003 | Mullen et al. | |
| 6,594,786 B1 | 7/2003 | Connelly et al. | |
| 6,606,658 B1 | 8/2003 | Uematsu | |
| 6,615,265 B1 | 9/2003 | Leymann et al. | |
| 6,633,916 B2 | 10/2003 | Kauffman | |
| 6,701,342 B1 * | 3/2004 | Bartz et al. ................. | 709/200 |
| 6,925,493 B1 * | 8/2005 | Barkan et al. .............. | 709/223 |
| 7,143,153 B1 * | 11/2006 | Black et al. ................ | 709/223 |
| 2003/0036886 A1 | 2/2003 | Stone | |
| 2003/0135609 A1 * | 7/2003 | Carlson ....................... | 709/224 |
| 2004/0117470 A1 * | 6/2004 | Rehm .......................... | 709/223 |
| 2004/0221038 A1 * | 11/2004 | Clarke et al. ............... | 709/226 |
| 2005/0071458 A1 * | 3/2005 | Fisher et al. ................ | 709/224 |

\* cited by examiner

*Primary Examiner*—David Wiley
*Assistant Examiner*—Kishin Belani
(74) *Attorney, Agent, or Firm*—Charles L. Moore; Frederick D. Bailey; Moore & Van Allen, PLLC

(57) ABSTRACT

A method to aggregate evaluation of at least one metric across a plurality of resources may include determining an aggregate evaluation of a selected metric for a group of resources of the plurality of resources. The method may also include adjusting the aggregate evaluation of the selected metric in response to any evaluation criteria and determining if any predetermined thresholds have been violated.

10 Claims, 4 Drawing Sheets

METHOD AND SYSTEM TO AGGREGATE EVALUATION OF AT LEAST ONE METRIC ACROSS A PLURALITY OF RESOURCES

BACKGROUND OF INVENTION

The present invention relates to service level agreements, service level objectives and evaluation of metrics associated therewith and more particularly to a method and system to aggregate evaluation of one or more metrics across a plurality of resources.

There are various environments when evaluating metrics across a number of resources associated with a service or system may be desirable. An example of one such environment is service level management. Service level management may involve monitoring services delivered to customers so that evaluations may be made whether the requirements of any Service level Agreements (SLAs) may have been breached. Service Level Agreements are contracts that provide agreements made about a service being provided by a service provider to a customer. The service being provided may involve infrastructure or facilities for e-commerce or other web-based services, data storage or data processing services, communication services or the like. Service Level Agreements typically include service level objectives (SLOs). The service level objectives may each define a set of resources of a particular resource type, one or more metrics that will be measured on each resource type, and one or more thresholds against which the metrics will be evaluated. Over time, measurement data is evaluated for the set of resources for each SLO and a determination made if any of the thresholds have been breached, causing a violation. Service level management systems look at availability within a single resource type at a time during a selected time period or evaluation interval and do not take into account the multiple different resource types simultaneous that may makeup an overall system and affect its performance. In addition to only observing a single resource type at a time, the service level management system may also only measure a metric associated with the single resource type and does take into account or aggregate these with other metrics or different types of metrics associated with other resource types.

SUMMARY OF INVENTION

In accordance with an embodiment of the present invention, a method to aggregate evaluation of at least one metric across a plurality of resources may include determining an aggregate evaluation of a selected metric for a group of resources of the plurality of resources. The method may also include adjusting the aggregate evaluation of the selected metric in response to evaluation criteria and determining if any predetermined thresholds have been violated.

In accordance with another embodiment of the present invention, a method to aggregate availability across a plurality of resources may include determining a total aggregate downtime for a group of resources of the plurality of resources during a predetermined time period. The method may also include adjusting the total aggregate downtime in response to an aggregation criteria and determining one of an availability or an unavailability for the group of resources in response to an adjusted total aggregate downtime.

In accordance with another embodiment of the present invention, a system to aggregate evaluation of at least one metric across a plurality of resources may include a processor. An evaluator, operable on the processor, may determine an aggregate evaluation of a selected metric for a group of resources of the plurality of resources. The evaluator may also adjust the aggregate evaluation of the selected metric in response to the evaluation criteria and may determine if any thresholds have been violated.

In accordance with another embodiment of the present invention, a method to make a system to aggregate evaluation of at least one metric across a plurality of resources may include providing a processor. The method may also include providing an evaluator, operable on the processor, to determine an aggregate evaluation of a selected metric for a group of resources of the plurality of resources. The evaluator may also adjust the aggregate evaluation of the selected metric in response to the evaluation criteria and may determine if any thresholds have been violated.

In accordance with a further embodiment of the present invention, a computer-readable medium having computer-executable instructions for performing a method may include determining an aggregate evaluation of a selected metric for a group of resources of the plurality of resources. The method may also include adjusting the aggregate evaluation of the selected metric in response to evaluation criteria and determining if any predetermined thresholds have been violated.

DETAILED DESCRIPTION

The following detailed description of preferred embodiments refers to the accompanying drawings, which illustrate specific embodiments of the invention. Other embodiments having different structures and operations do not depart from the scope of the present invention.

Figure 1:
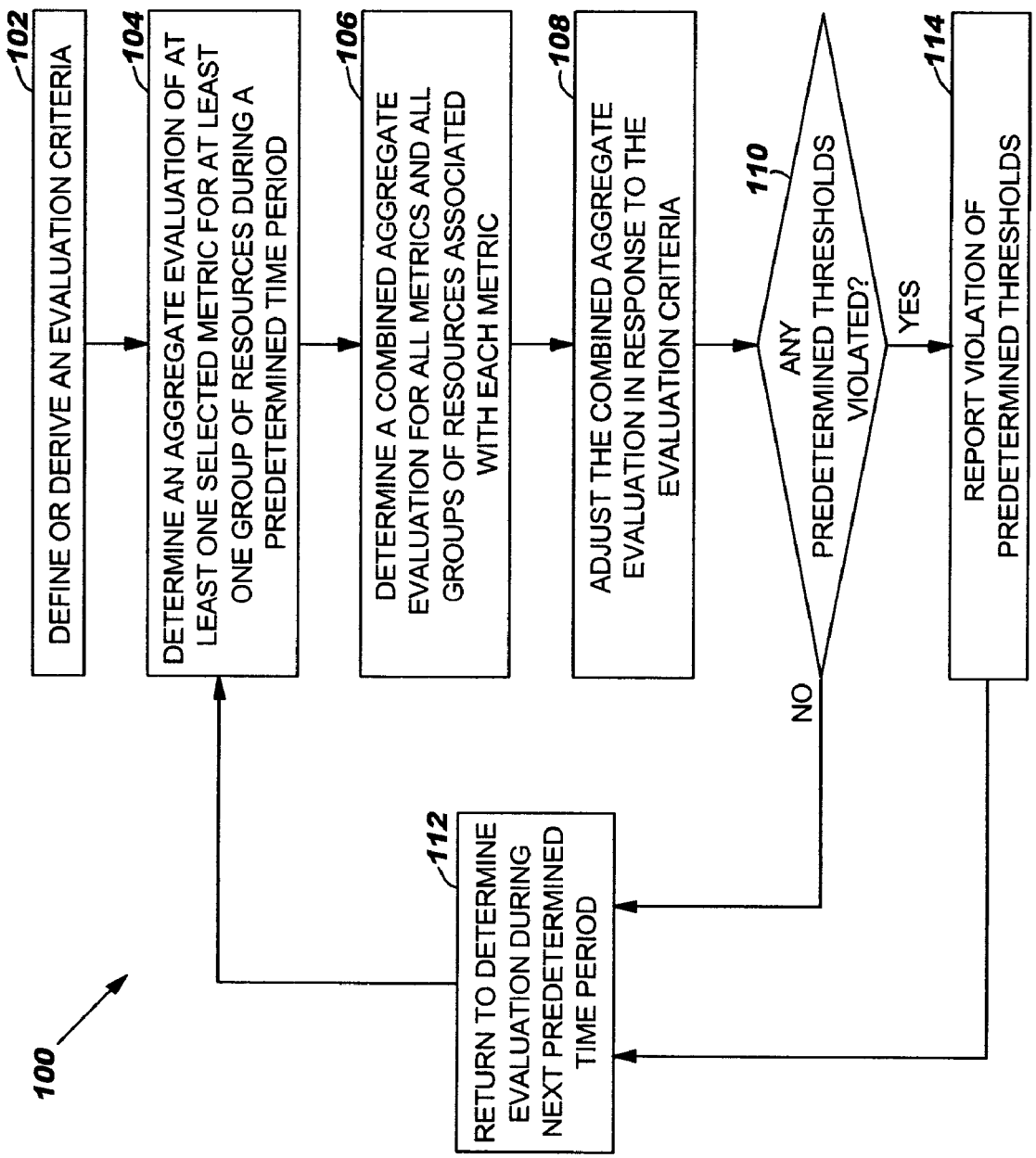
FIG. 1 is a flow chart of a method to aggregate evaluation of at least one metric across one or more groups of resources during a predetermined time period in accordance with an embodiment of the present invention.

FIG. 1 is a flow chart of a method 100 to aggregate evaluation of at least one metric across one or more groups of resources during a predetermined time period or evaluation interval in accordance with an embodiment of the present invention. Examples of metrics may include but are not limited to resource availability metrics, resource performance metrics, resource response time metrics, resource utilization metrics, memory utilization metrics, web page rendering time, or any other type measurable item related to a resource or group of resources. Resources may be component parts of a computer system or data processing system or network, communications network or system, an Intranet or private network, the Internet or the like. Resources may be anything from which metrics may be measured or from which data may be obtained to measure availability, performance, capacity, runtime, utilization or the like, to name a few examples. Examples of resources may be web servers (Internet and intranet), database servers, file servers, File Transfer Protocol (FTP) servers, mail servers, application servers, applications, transactions or other components in a system or network. Resources may be embodied in hardware, software, firmware or the like. The resources may be grouped using a predetermined criteria, such as resources of a similar type or that perform the same or a similar function may be grouped together for purposes of measuring metrics and evaluation of the measured metrics.

In block 102, evaluation criteria may be defined or derived. As an example, the evaluation criteria may be derived from a service level agreement (SLA) or by some other means. While the present invention may be described with respect to service level agreements, the present invention is applicable to any environment where it is desirable to evaluate availability, performance or other metrics across multiple resources. In the SLA example, a service level objective (SLO) in the SLA may specify that at least one metric measured on a certain type of resource or types of resources during an evaluation period must meet a selected requirement or threshold to satisfy the SLO and not breach or violate the SLA. For instance, the service level objective may specify that a predetermined number or percentage of servers of a certain type or types must be available during an evaluation period or for a predetermined percentage of the time during the evaluation period to satisfy the SLO. Accordingly, the derived evaluation criteria would be to count or attribute downtime to the system during the evaluation period only for that length time when more than the percentage or predetermined number of servers are unavailable at the same time. When aggregating availability, the overlap of unavailable time across resources is taken into account.

In another example of deriving an evaluation criteria from a service level agreement, the service level objective in the service level agreement may specify that a predetermined number or percentage of a particular type of resource must be available for a preset percentage of the evaluation time period to satisfy the SLO. Accordingly, the derived evaluation criteria would be to count or attribute downtime to the system during the evaluation time period only when the predetermined number or percentage of resources were unavailable for more than the preset percentage of the evaluation time period. In addition to resource availability metrics, further examples of deriving an evaluation criteria may involve resource performance metrics, resource response time metrics, resource utilization metrics, memory utilization metrics or other measurable criteria.

In block 104, an aggregate evaluation of at least one selected metric for at least one group of resources of a plurality of resources may be determined during the predetermined time period or evaluation time period. The aggregate evaluation may be determined by combining or aggregating the measured metric for all the resources during the evaluation time period. Aggregate evaluations may also be determined for at least one other chosen metric for one or more other groups of resources of the plurality of resources during the predetermined time or evaluation period. The at least one chosen metric and the at least one selected metric may be the same or a different metric. If additional evaluations are determined for other metrics and groups of resources, a combined aggregate evaluation for all metrics and all groups of resources associated with each metric may be determined in block 106.

In block 108, the combined aggregate evaluation may be adjusted in response to the evaluation criteria. Any allowances, such as overlapping downtime, variations in performance, different time periods of the day or the like, permitted by the service level agreement or service level objectives may be taken into account to adjust the combined aggregate evaluation. The adjusted aggregate evaluation provides a more realistic evaluation for determining whether the service level objectives have been violated and the service level agreement breached.

In block 110, a determination may be made if any thresholds defined in the service level agreement or service level objectives have been violated. If no thresholds have been violated, the method 100 may return to block 112 to determine a subsequent evaluation during the next predetermined time period or evaluation interval. If a threshold has been violated, the violation may be reported in block 114. The method 100, may then return via block 112 to determine or perform a subsequent evaluation during the next evaluation interval or time period.

Figure 2:
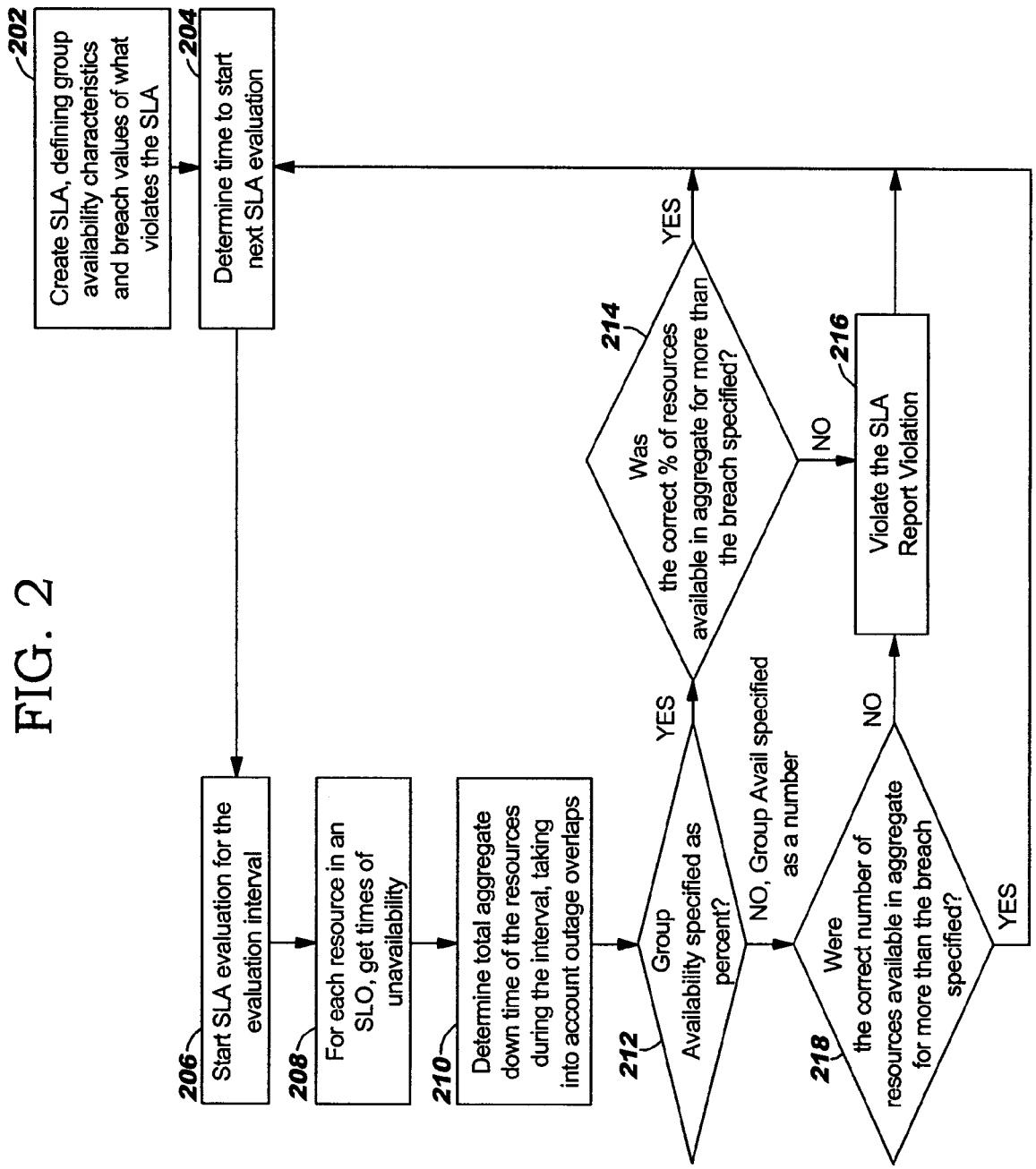
FIG. 2 is a flow chart of a method to aggregate evaluation of at least one metric across a plurality of resources during a predetermined time period in accordance with another embodiment of the present invention.

FIG. 2 is a flow chart of a method 200 to aggregate evaluation of at least one metric across a plurality of resources during a predetermined time period or evaluation interval in accordance with another embodiment of the present invention. In block 202, a service level agreement (SLA) may be created. The service level agreement may define group availability characteristics for a group of resources and thresholds or breach values of what violates the service level agreement. In block 204, a time to start a SLA evaluation or to start a next SLA evaluation may be determined. In block 206, a SLA evaluation for an evaluation interval may be started in response to the correct time as determined in block 204. In block 208, times of unavailability are acquired or recorded for each resource in a group. In block 210, a total aggregate downtime of the resources may be determined, taking into account any outage overlaps or adjusting the aggregate downtown in response to any outage overlaps or evaluation criteria derived from the service level agreement.

In block 212, a determination may be made if the group or resource availability was specified as a percent in the service level agreement or service level objective. If the group or resource availability was specified as a percent, the method 200 may advance to block 214. In block 214, a determination may be made if the correct percentage of resources were available in aggregate for more than the threshold value specified in the service level agreement or service level objective that would constitute a breach or violation. If the percentage of resources were available for more than the breach specified or threshold value, in block 214, the method 200 may return to block 204 to determine a start time for the next SLA evaluation. If the percentage of resources were not available for more than the threshold value or breach specified in the service level agreement, the service level agreement is violated in block 216 and a report or notice of such violation may be provided. The method 200 may then return to block 204 to determine the time to start the next SLA evaluation.

Returning to block 212, if the group availability was specified as a number rather than a percent, the method 200 may advance to block 218. In block 218, a determination may be made if the correct number of resources were available in aggregate for more than the threshold value or breach specified in the service level agreement or service level objective. If the correct number of resources were available in block 218, the method 200 may advance to block 204 to determine a start time for the next SLA evaluation. If the correct number of resources were not available in aggregate for more than the breach specified, the SLA is violated in block 216 and a notice or report of such violation may be provided.

While the method 200 has been described with respect to evaluating availability of a resource or group of resources, the method 200 may also be applicable to any metric or item that may be measured or recorded and evaluated with respect to a system or network.

Figure 3:
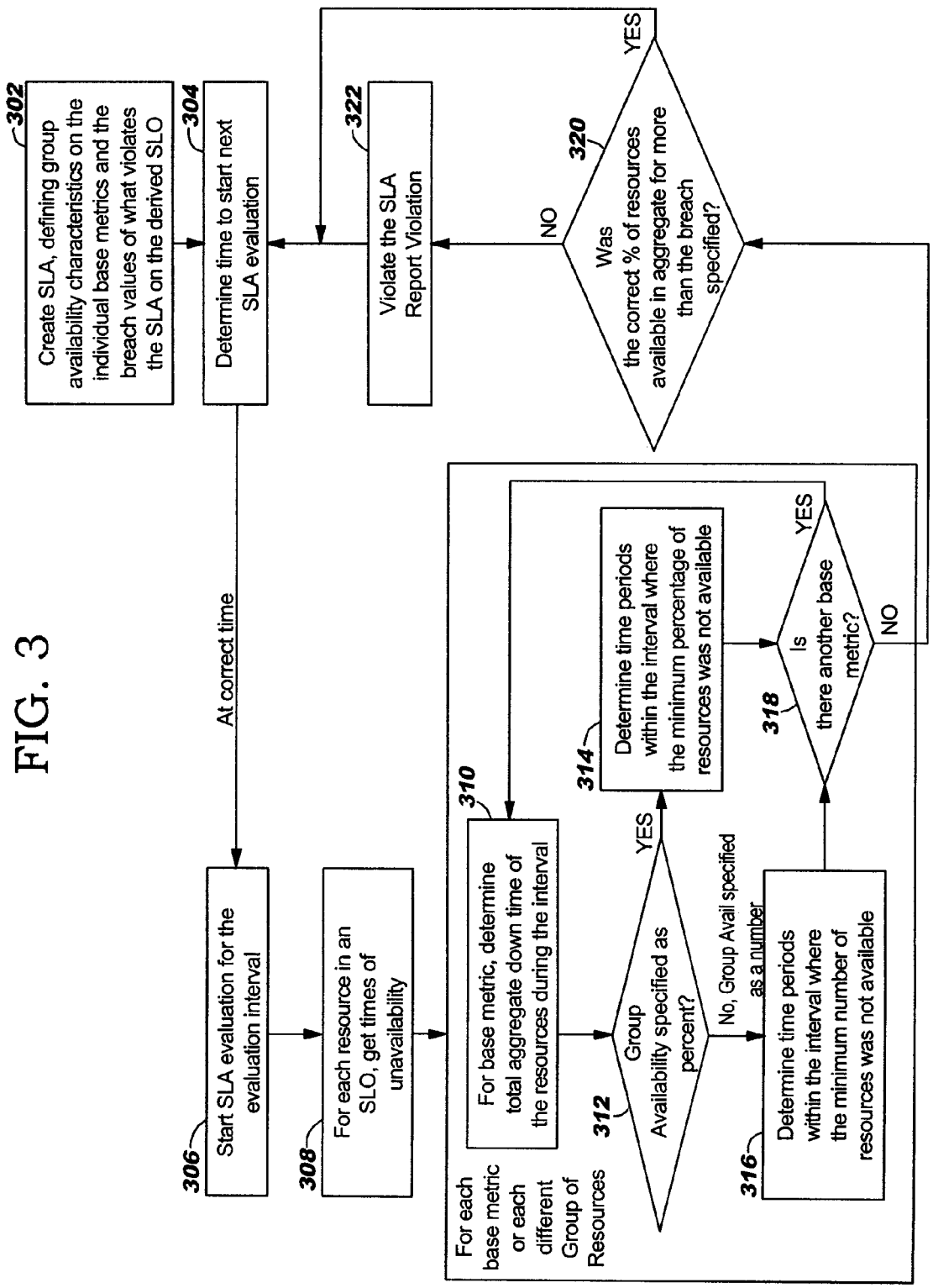
FIG. 3 is a flow chart of a method to aggregate evaluation of multiple metrics across different groups of resources during a predetermined time period in accordance with another embodiment of the present invention.

FIG. 3 is a flow chart of a method 300 to aggregate evaluation of multiple metrics across different groups of resources during a predetermined time period in accordance with another embodiment of the present invention. In block 302, a service level agreement (SLA) may be created. The service level agreement may define group availability characteristics on individual base metrics for each group and the breach values for each base metric of what violates the service level agreement on the derived service level objective or evaluation criteria. In block 304, a time to start a SLA evaluation or a next SLA evaluation may be determined. In block 306, a SLA evaluation may be started for the evaluation interval or predetermined time period for evaluation. In block 308, times of unavailability may be obtained or gathered for each resource in a group or defined in a service level objective.

In block 310, a total aggregate downtime of the resources in the group may be determined for the base metric during the evaluation interval. In block 312, a determination may be made if the group availability has been specified as a percent or a number of resources available. If the group availability has been specified as a percent, the method 300 may advance to block 314. In block 314, time periods during the evaluation interval when the minimum percentage of resources was not available may be determined for use in determining the total aggregate downtime for the group of resources. The total aggregate downtime may be determined by adjusting for or taking into account any overlaps based on the evaluation criteria derived from the service level agreement or service level objective. Returning to block 312, if the group availability has been specified as a number, the method 300 may advance to block 316. In block 316, the time periods during the evaluation interval when the minimum number of resources was not available may be determined for use in determining the total aggregate downtime. In block 318, a determination may be made if there is another base metric or group of resources for which downtime or other metric needs to be determined or evaluated. If there is another base metric or group of resources in block 318, the method 300 may return to block 310 and the method 300 will proceed as previously described until all base metrics or resource groups have been evaluated as described with respect to blocks 310-318.

If there are no other base metrics or groups of resources in block 318, the method 300 may advance to block 320. In block 320, a determination may be made if the correct percentage or number of resources were available in aggregate for more than the breach specified or predetermined threshold as derived from the service level agreement or service level objective. If the correct percentage or number of resources was available in aggregate for more than the breach specified, the method 300 may return to block 304 and a time to start the next SLA evaluation may be determined. If the percentage or number of resources available in aggregate in block 320 is less than the breach specified, the service level agreement is violated in block 322. A notice or report of the violation of the service level agreement may be provided in block 322. The method 300 may then return to block 304 where the time to start a next evaluation may be determined.

While the method 300 has been described with respect to evaluating availability of a group of resources, the method 300 may also be applicable to any metric or item that may be measured or recorded and evaluated with respect to a system or network.

Examples of the application of methods 100, 200 and 300 of FIGS. 1, 2 and 3 will now be described. Assuming three web servers (WS1, WS2 and WS3) are serving a particular web site. The service level agreement may provide that at least two of the web servers must be available at all times, i.e., for 100% of the evaluation interval. The evaluation criteria in block 102 of FIG. 1 or breach value in block 202 or 302 of FIGS. 2 and 3 may be that as long as no more than one of the servers is unavailable at the same time during the evaluation interval, the service level objective is not violated and the service level agreement is not breached. Alternatively, the service level agreement may specify that 66% of the web servers must be available at all times (for 100% of the evaluation interval). The times of unavailability for each resource or server may be obtained or gathered as described in blocks 208 and 308 of FIGS. 2 and 3. During the evaluation time period or interval, WS1 was down for 10 minutes between 12:00 pm and 12:10 pm. WS2 was down for 10 minutes between 9:00 am and 9:10 am and again for 20 minutes between 10:35 am and 10:55 am. WS3 was down for 15 minutes between 10:30 am and 10:45 am. The aggregate evaluation of the selected metric (Block 104 of FIG. 1) or total aggregate downtime or unavailability of the resources (Block 210 of FIG. 2 or block 310 of FIG. 3) is determined to be 55 minutes. However, this total aggregate evaluation or downtime may be adjusted (block 108, FIG. 1) or outage overlaps taken into account (blocks 210 and 310 of FIGS. 2 and 3) in response to the evaluation criteria derived from the service level agreement. In this example, there is an overlap of 10 minutes for WS2 and WS3 between 10:35 am and 10:45 am. Because the evaluation criteria or breach value of what violates the service level agreement is that no more than one of the servers be unavailable at the same time during 100% of the evaluation interval (block 218 of FIG. 2), the threshold is violated (block 110 of FIG. 1) and the service level agreement breached as a result of the 10 minute overlap.

In this example, the group availability specification was that the web servers need to be available for 100% of the evaluation interval. This equates to a breach value on the service level objective of 100%. The breach value may also be specified as a percentage of the time that the resource is unavailable taking into account overlapping downtime. This provides a more flexible definition of what causes a service level objective to be violated. For example, the service level agreement or objective may specify that at least two servers must be available for 87.5% of the time or the service level objective is violated (group availability is two and breach value is 87.5%). Under this scenario, the service level objective would not be violated assuming that the 10 minutes that WS2 and WS3 were unavailable means that at least two servers were available 90% of the evaluation interval.

In another example, a service may require a plurality of different resources, such as web servers and database servers or systems, be available. The service may include a main database system and a backup database system that is redundant. The service may also include three web servers that process requests and if at least two out of three web servers are available at any given time, then the response time is adequate. For the total service to be considered available, at least one out of two redundant database systems must be available and two out of three web servers must be available. A customer may want to define a service level agreement to determine how often the total service is not available and is violated if the service is less than 97% available over the evaluation interval. To create the service level agreement, two different availability metrics may be defined, one base metric for the group of database systems and one base metric for the group of web servers. The evaluation may be aggregated across each group of resources for each base availability metric and then aggregated across the evaluation for both groups for the base metric.

Assume an evaluation across the three web server resources, WS1, WS2 and WS3, provides the following unavailability data: WS1 is unavailable from 10:15 to 10:30 and 17:30 to 17:45 (30 minutes, 97.92% available during the 24 hour evaluation interval); WS2 is unavailable from 17:00 to 17:40 (40 minutes, 97.22% available); WS3 is unavailable from 10:10 to 10:20, 13:00 to 13:25 and 17:15 to 17:55 (75 minutes, 94.79% available during evaluation interval).

The aggregated total unavailability (sum of times that any resource was unavailable) is 100 minutes (10:10-10:30, 13:00 to 13:25 and 17:00-17:55, time periods when less than 100% of resources were available) when at least one resource was unavailable or a final percentage of 93.06% for the evaluation interval. However, the evaluation criteria from the service level agreement requires that at least two out of the three web servers be available at any give time. Therefore, a determination needs to be made when less than two servers were available. Less than two servers were available 10:15-10:20 and 17:15-17:45. Evaluating the aggregate unavailability provides 35 minutes when less than two servers or resources were available or 97.57% of the 24-hour evaluation interval.

The service level agreement also requires that at least one of the two database systems be available during the evaluation interval. In this example, the two database systems (DB1 and DB2) have the following unavailability: DB1 is unavailable from 10:00 to 10:30 and from 15:00 to 15:30 (60 minutes, 95.83% available during the 24 hour evaluation interval); DB2 is unavailable from 10:17 to 10:37 and from 15:20 to 15:50 (50 minutes, 96.53% available during the 24 hour evaluation interval).

The service level agreement would be breached or violated when the service is less than 97% available over the evaluation interval or predetermined time period. The service would not be available whenever less than one of the two database servers was available. From the unavailability data above, time periods when less than one database server was available are 10:17-10:30 and 15:20-15:30 for a total unavailability of 23 minutes or a 98.4% availability over the 24 hour evaluation interval.

The example above illustrates how an aggregate evaluation may be determined across different groups of resources for at least one selected metric during a predetermined time period or evaluation interval as in block 104 of FIG. 1 or blocks 310-318 in FIG. 3. Aggregate evaluation data has been determined for when less than two out of three web servers were available and aggregate evaluation data has been determined for when less than one database server was available. A combined aggregate evaluation for both groups of resources or types of servers may now be determined pursuant to block 106 of FIG. 1. Times when less than two web servers were available in the example are 10:15-10:20 and 17:15-17-17:45. Times when less than one database server were available are 10:17-10:30 and 15:20-15:30. Determining the combined aggregate evaluation when less than two web servers were available or when less than one database server was available are 10:15-10:30, 15:20-15:30 and 17:15-17:45 provides an unavailability of 55 minutes or an availability of 96.18% during the 24 hour evaluation interval. The combined aggregate evaluation takes into account or adjusts for any evaluation criteria, such as overlapping downtime as indicated by the combined overlapping downtimes between the web servers and database servers. From the service level agreement stated above, the service is considered to be available when at least two web servers and at least one database server are available at a given time for 97% of the evaluation interval. From the aggregated evaluation, the service was only available 96.18% of the evaluation interval. Thus, in this example, the service level agreement would have been breached or violated.

The present invention can pull together the availability of many different types of resources and has the flexibility to determine a complex aggregated evaluation for different metrics measured across different resources or groups of resources. For both aggregation within a service level objective and aggregation of resources across different metrics to create a derived service level objective, the resources can be specified as a static list or a dynamic list. The static list may specify the exact resource names of each of the resources to be evaluated. The dynamic list may use a wildcard filter at the time of evaluation to determine which resources match the filter, i.e., *.usa.company.com. The evaluation may also take into account or adjust as part of the evaluation criteria for the schedule states normally associated with a service level agreement and used in the evaluation process (block 108 of FIG. 1). These schedule states may define the different periods of the day, such as peak time, off-hours or the like. Different thresholds may be specified for each of the different schedule periods based on the availability, performance, capacity or other needs of the service. For any time periods which may be defined as "No Service," for example Sundays between 1:00 am and 3:00 am, measurement or metric data from the resources may not be used as part of the evaluation process.

Figure 4:
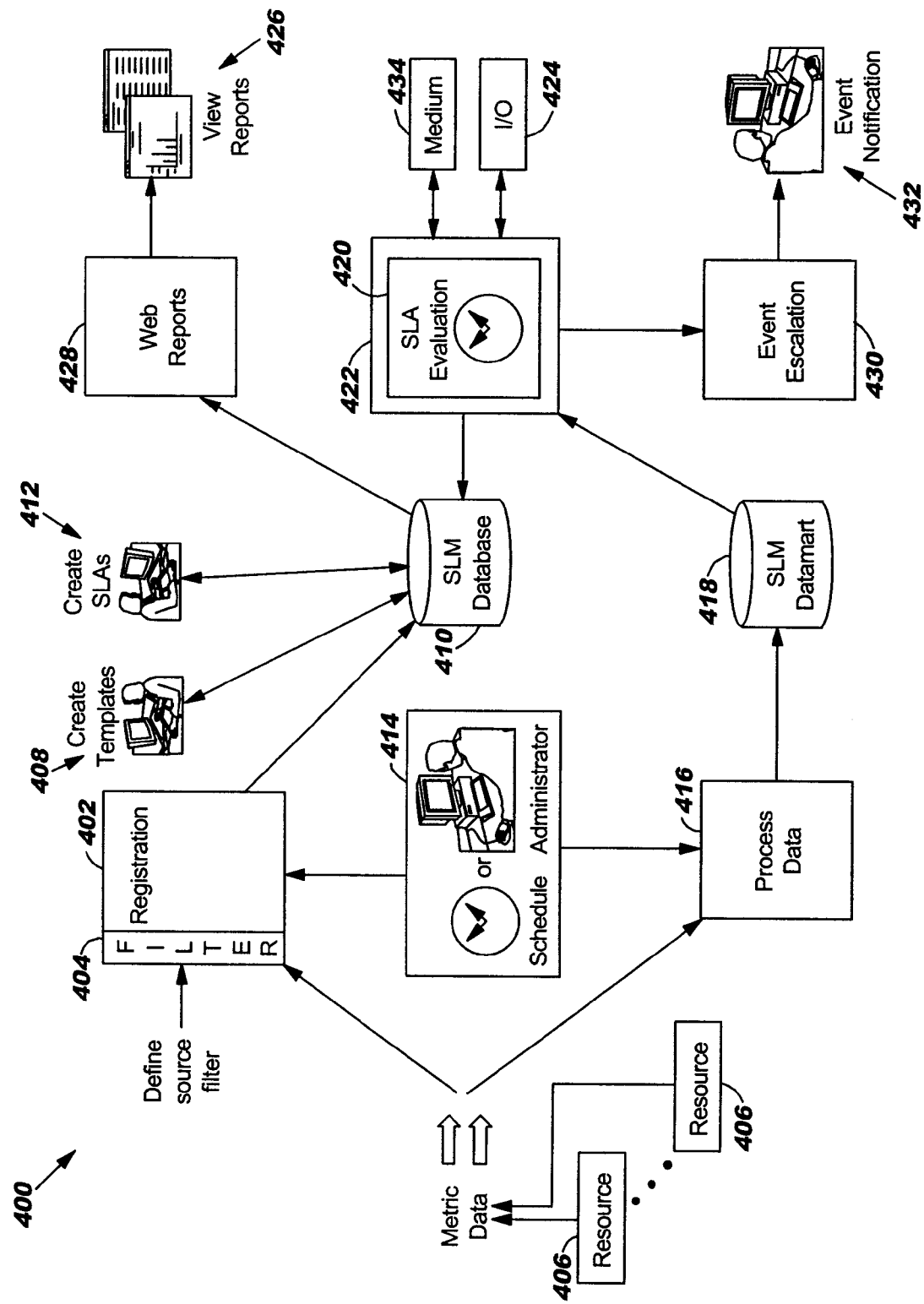
FIG. 4 is a example of a system to aggregate evaluation of at least one metric across one or more groups of resources during a predetermined time period in accordance with an embodiment of the present invention.

FIG. 4 is a example of a system 400 to aggregate evaluation of at least one metric across one or more groups of resources during a predetermined time period in accordance with an embodiment of the present invention. Elements of the methods 100, 200 and 300 of FIGS. 1, 2 and 3 respectively, may be embodied in or operate on the system 400. The system 400 may include a registration module or element 402 in which a source filter 404 may be defined and reside. The source filter 404 may filter application or metric data from different resources 406 or groups of resources 406. Templates 408 for service level agreements or objects may be created and stored in a service level management (SLM) database 410. Service level agreements (SLA) 412 may also be created and stored in the SLM database 410. The SLAs 412 may be created using the templates 408 or by other means.

A scheduler, schedule element or administrator 414 may schedule evaluation intervals or evaluation time periods and initiate evaluations according to the schedule. A data processing module or element 416 may receive metric data from the resources 406. The data or other information related to an evaluation may also be received and filtered by the filter 404. The metric data may be deposited in a service level management (SLM) datamart 418 or data repository. A service level agreement evaluation element or evaluator 420 may receive the metric data received during an evaluation interval or time period and may perform an aggregate evaluation for all metrics and all groups of resources associated with each metric. The evaluator 420 may perform functions similar to those described with respect to methods 100, 200 and 300 described with respect to FIGS. 1, 2 and 3 respectively. The evaluator 420 may be embodied in computer-readable or compute-executable instruction operable on a processor 422. The processor 420 may be coupled to one or more input/output devices 424 or mediums that may be separate input and output devices or combination input and output devices. The input/output devices 424 may include a keyboard, pointing device, voice recognition system or the like. The input/output devices 424 may also include optical, magnetic, infrared or radio frequency input devices or combination input/output devices, such as disk drives or the like. The input devices 424 may receive read or download software, computer-executable or readable instructions or the like, such as software that may embody elements of the methods 100, 200 and 300.

Results of the aggregate evaluation may be stored in the SLM database 410. Reports 426 of the evaluations may be created by a reports or web reports module or element 428. The reports 426 may be generated using a web-based programming language, such as hypertext markup language (HTML), Java or similar language, and may be presented via a network, such the Internet or World Wide Web, intranet, private network or the like.

If a threshold or service level objective is determined to be violated by the SLA evaluation element 420, an event escalation module or element 430 may provide event notification 432 to an authority monitoring the service.

Each of the elements of the system 400 may be interconnected by a medium or communication network, such as the medium 434 illustrated as being couple to the processor 420. The communication network or medium 434 may be any communication system including by way of example, dedicated communication lines, telephone networks, wireless data transmission systems, two-way cable systems, customized computer networks, interactive kiosk networks, the Internet and the like.

Elements of the present invention, such as methods 100, 200 and 300 of FIGS. 1, 2 and 3, respectively, and system 400 of FIG. 4, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in the medium for use by or in connection with a system, such as system 400 of FIG. 4. Examples of such a medium may be illustrated in FIG. 4 as input devices 424 or medium 434. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network, such as the Internet or the like. The computer-usable or readable medium could also be paper or another suitable medium upon which the program may be printed.

While the present invention has been described as being applicable to service level agreements and service level management systems as examples, the present invention is applicable to any environment where metrics related to one or more different types of resources may be measured and evaluated over time. As another example, data for just a normal operations console may be used to determine a service's true downtime, evaluating on the fly up to current data.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A system to aggregate evaluation of at least one metric across a plurality of resources, comprising:
   a processor; and
   an evaluator operable on the processor to form groups of resources of the plurality of resources comprising resources of a same type, each formed group of resources being of a different type, determine an aggregate evaluation of a selected metric for each group of resources of the plurality of resources, to adjust the aggregate evaluation of the selected metric for each group in response to evaluation criteria where the evaluation criteria is specific to each group, determine a combined aggregate evaluation for all metrics and all groups of resources associated with each metric, and to determine if any predetermined thresholds have been violated based on the combined aggregate evaluation.

2. The system of claim 1, further comprising a data source to store metric information from each resource of the group of resources.

3. The system of claim 1, further comprising a service level management database to store service level management information.

4. The system of claim 1, further comprising means for presenting the aggregate evaluation of the selected metric for the group of resources.

5. The system of claim 1, wherein the selected metric is one of a resource availability metric, a resource performance metric, a resource response time metric, a resource utilization metric and a memory utilization metric.

6. The system of claim 1, wherein the evaluation criteria is derived from a service level agreement to adjust the aggregated evaluation of the selected metric.

7. A computer-readable medium comprising computer-executable instructions, the computer executable instructions when executed on a computer causing the computer to perform:
   forming groups of resources of the plurality of resources using a predetermined criteria comprising resources of a same type, each formed group of resources being of a different type;
   determining an aggregate evaluation of a selected metric for each group of resources of the plurality of resources, the selected metric being specific to each group;
   adjusting the aggregate evaluation of the selected metric for each group in response to evaluation criteria;
   determining a combined aggregate evaluation for all selected metrics for all groups of resources; and
   determining if any predetermined thresholds have been violated based on the combined aggregate evaluation.

8. The computer-readable medium having computer executable instructions for performing the method of claim 7, further comprising adjusting the combined aggregate evaluation in response to the evaluation criteria.

9. The computer-readable medium having computer executable instructions for performing the method of claim 7, further comprising selecting the metric from one of a resource availability metric, a resource performance metric, a resource response time metric, a resource utilization metric and a memory utilization metric.

10. The computer-readable medium having computer executable instructions for performing the method of claim 7, further comprising deriving evaluation criteria from a service level agreement.

* * * * *